US012658751B2

(12) United States Patent
Sawahata et al.

(10) Patent No.: US 12,658,751 B2
(45) Date of Patent: Jun. 16, 2026

(54) ROTARY ELECTRIC MACHINE

(71) Applicant: Hitachi Astemo, Ltd., Hitachinaka (JP)

(72) Inventors: Masanori Sawahata, Tokyo (JP); Masahiro Hori, Tokyo (JP); Hideaki Goto, Hitachinaka (JP); Takaki Itaya, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 269 days.

(21) Appl. No.: 18/017,953

(22) PCT Filed: Aug. 4, 2021

(86) PCT No.: PCT/JP2021/028949
§ 371 (c)(1),
(2) Date: Jan. 25, 2023

(87) PCT Pub. No.: WO2022/054470
PCT Pub. Date: Mar. 17, 2022

(65) Prior Publication Data
US 2023/0291260 A1      Sep. 14, 2023

(30) Foreign Application Priority Data

Sep. 9, 2020    (JP) ................................. 2020-151187

(51) Int. Cl.
*H02K 1/32* (2006.01)
*H02K 1/276* (2022.01)
*H02K 9/19* (2006.01)

(52) U.S. Cl.
CPC .............. *H02K 1/32* (2013.01); *H02K 1/276* (2013.01); *H02K 9/19* (2013.01)

(58) Field of Classification Search
CPC ........ H02K 1/276; H02K 1/2766; H02K 1/32; H02K 9/19; Y02T 10/64
(Continued)

(56) References Cited

U.S. PATENT DOCUMENTS 9,484,790 B2 * 11/2016 Takahashi .............. H02K 9/223
9,621,002 B2 * 4/2017 Schreiber ................ H02K 1/28
(Continued)

FOREIGN PATENT DOCUMENTS

JP      2007-151362 A      6/2007
JP      2009-232557 A      10/2009
(Continued)

OTHER PUBLICATIONS

English translation of International Search Report issued in corresponding International Application No. PCT/JP2021/028949, dated Oct. 19, 2021.

*Primary Examiner* — Alex W Mok
(74) *Attorney, Agent, or Firm* — Foley & Lardner LLP

(57) ABSTRACT

An object of the present invention is to provide a rotary electric machine in which damage of a magnet is suppressed and cooling performance of the magnet is improved.
The present invention includes a rotation shaft 21, a rotor 20, and core end members 204 and 205 connected to end portions of the rotor 20. The rotor 20 includes a magnet 201, a rotor core 200, and interposed members 301*a* and 301*b* interposed between the magnet 201 and the rotor core 200. In the rotor core 200, a magnet insertion hole 202 for disposing the magnet 201 and flux barriers 203*a* and 203*b* are formed. The rotation shaft 21 is provided with a first flow path 21*a* through which a refrigerant flows. The core end members 204 and 205 are provided with a second flow path 504*a* joining the first flow path 21*a* and the flux barrier 203*a*. The interposed members 301*a* and 301*b* are provided along the axial direction such that a cooling flow path for the refrigerant is formed on both facing surfaces of the central portion of the magnet 201 in the axial direction, which are long sides of a rectangular cross section.

8 Claims, 14 Drawing Sheets

(58) Field of Classification Search
USPC .......................................................... 310/54
See application file for complete search history.

(56) References Cited

U.S. PATENT DOCUMENTS

| | | | | |
|---|---|---|---|---|
| 10,116,178 | B2 * | 10/2018 | Horii ........................ | H02K 1/28 |
| 10,320,249 | B2 * | 6/2019 | Okamoto ................. | H02K 1/32 |
| 2012/0161556 | A1 * | 6/2012 | Mizutani ............... | H02K 55/02 |
| | | | | 310/64 |
| 2012/0235531 | A1 * | 9/2012 | Fukasaku .............. | H02K 15/12 |
| | | | | 310/156.23 |
| 2013/0038151 | A1 * | 2/2013 | Ohashi ................... | H02K 7/086 |
| | | | | 310/59 |
| 2013/0334910 | A1 * | 12/2013 | Takahashi ............ | H02K 1/2766 |
| | | | | 29/598 |
| 2015/0357872 | A1 * | 12/2015 | Schreiber ............... | H02K 1/276 |
| | | | | 310/156.16 |
| 2016/0261158 | A1 | 9/2016 | Horii et al. | |
| 2016/0359384 | A1 | 12/2016 | Okamoto et al. | |
| 2020/0186007 | A1 * | 6/2020 | Kitao .................... | H02K 15/03 |

FOREIGN PATENT DOCUMENTS

| | | |
|---|---|---|
| JP | 2014-183602 A | 9/2014 |
| JP | 2019-140848 A | 8/2019 |
| WO | WO-2015/087445 A1 | 6/2015 |
| WO | WO-2015/146210 A1 | 10/2015 |
| WO | WO-2019/008820 A1 | 1/2019 |

* cited by examiner

LOAD SIDE ←→ ANTI-LOAD SIDE

DOWN

LOAD SIDE ←——→ ANTI-LOAD SIDE

ROTARY ELECTRIC MACHINE

TECHNICAL FIELD

The present invention relates to a rotary electric machine.

BACKGROUND ART

Rotary electric machines are used in industrial equipment, electric vehicles, hybrid vehicles, and the like. The rotary electric machine used for such devices is required to reduce the size and have a high output. In order to meet this demand, the rotary electric machine tends to rotate at a high speed. With the high-speed rotation, the loss due to the radio-frequency magnetic flux and the heat generation accompanying the loss increase in the rotary electric machine. A coil is disposed on a stator side of the rotary electric machine, and a magnet is disposed in a magnet insertion hole on a rotor side. In the rotary electric machine, the coil and the magnet mainly generate heat, and cooling of the coil and the magnet is required.

In order to cool the magnet, for example, a method of causing a refrigerant to directly flow to the magnet is used. The refrigerant is supplied from a refrigerant storage portion to the magnet by driving a pump or the like. The magnet inserted into the magnet insertion hole of the rotor is fixed to the magnet insertion hole by using an adhesive or the like, in order to withstand a centrifugal force generated during rotation of the rotor and a repulsive force generated when the rotor stops. Since the refrigerant cannot flow through an adhering portion between the magnet and the magnet insertion hole, the refrigerant flows through a flux barrier of the rotor to cool the magnet. Since the magnet exposed to the flux barrier is the short side of the rectangular cross section, and the refrigerant flows along the wall surface of the short side, the surface area of the magnet in contact with the refrigerant is reduced, and the magnet cannot be effectively cooled.

Therefore, a technique in which one wall surface among wall surfaces along a long side of a rectangular cross section of a magnet is adhered to a magnet insertion hole, and a refrigerant is caused to flow in a gap formed between the other wall surface and an inner wall surface of the magnet insertion hole has been proposed. Examples of such a technique include PTL 1 and PTL 2.

CITATION LIST

Patent Literature

PTL 1: International Publication No. 2019/008820
PTL 2: International Publication No. 2015/087445

SUMMARY OF INVENTION

Technical Problem

Since the temperature of the magnet inserted into the magnet insertion hole of the rotor particularly tends to rise in the axial central portion of the magnet, it is required to actively cool this portion. In the techniques disclosed in PTLs 1 and 2, the refrigerant also flows in the vicinity of the central portion on one surface of the magnet on the long side, but the refrigerant does not flow on the other surface that is adhered. Thus, the magnet cannot be effectively cooled. In addition, since only one side of the magnet is in contact with the inner wall surface of the magnet insertion hole, adhesion of the magnet is weak, and there is a probability that the magnet is peeled off due to repetition of driving and stop of the rotary electric machine.

There is a technique in which a magnet inserted into a magnet insertion hole is not fixed with an adhesive, and a refrigerant is caused to flow to both surfaces of the magnet on a long side. However, since the magnet is not fixed in the magnet insertion hole, there is a concern that the magnet collides with a wall surface of the magnet insertion hole due to a centrifugal force generated during rotation of the rotor and a repulsive force generated when the rotor stops, and thus the magnet is damaged.

An object of the present invention is to solve the above problems and to provide a rotary electric machine in which damage of a magnet is suppressed and cooling performance of the magnet is improved.

Solution to Problem

To achieve the above object, the present invention includes a rotation shaft, a rotor connected to the rotation shaft, and a core end member connected to an end portion of the rotor in an axial direction. The rotor includes a magnet, a rotor core that houses the magnet, and an interposed member interposed between the magnet and the rotor core. In the rotor core, a magnet region for disposing the magnet, and a flux barrier region that is joined to the magnet region and causes a demagnetization action are formed. The rotation shaft is provided with a first flow path through which a refrigerant flows. The core end member is provided with a second flow path joining the first flow path and the flux barrier region. The interposed member is provided along the axial direction such that a cooling flow path for the refrigerant is formed on both facing surfaces of a central portion of the magnet in the axial direction, which are long sides of a rectangular cross section of the magnet when viewed from the axial direction.

Advantageous Effects of Invention

According to the present invention, it is possible to provide a rotary electric machine in which damage of a magnet is suppressed and cooling performance of the magnet is improved.

BRIEF DESCRIPTION OF DRAWINGS

FIG. 1 is a schematic cross-sectional view of a rotary electric machine according to Embodiment 1 of the present invention, in an axial direction.

FIG. 3 is an enlarged perspective view of a portion of the rotor according to Embodiment 1 of the present invention.

FIG. 5 is a perspective view of the rotor illustrating a flow of a refrigerant according to Embodiment 1 of the present invention.

FIG. 9 is an enlarged perspective view of a portion of a rotor according to Embodiment 3 of the present invention.

FIG. 10 is an enlarged perspective view of a portion of a rotor according to Embodiment 4 of the present invention.

FIG. 11 is an enlarged perspective view of a portion of a rotor according to Embodiment 5 of the present invention.

DESCRIPTION OF EMBODIMENTS

Hereinafter, embodiments of the present invention will be described with reference to the accompanying drawings. The same components are denoted by the same reference signs, and the same description will not be repeated.

The various components of the present invention do not necessarily need to be independent, and allow one component to be configured by a plurality of members, a plurality of components to be configured by one member, a certain component to be a portion of another component, a portion of one component and a portion of another component to overlap with each other, and the like.

Embodiment 1

Figure 1:
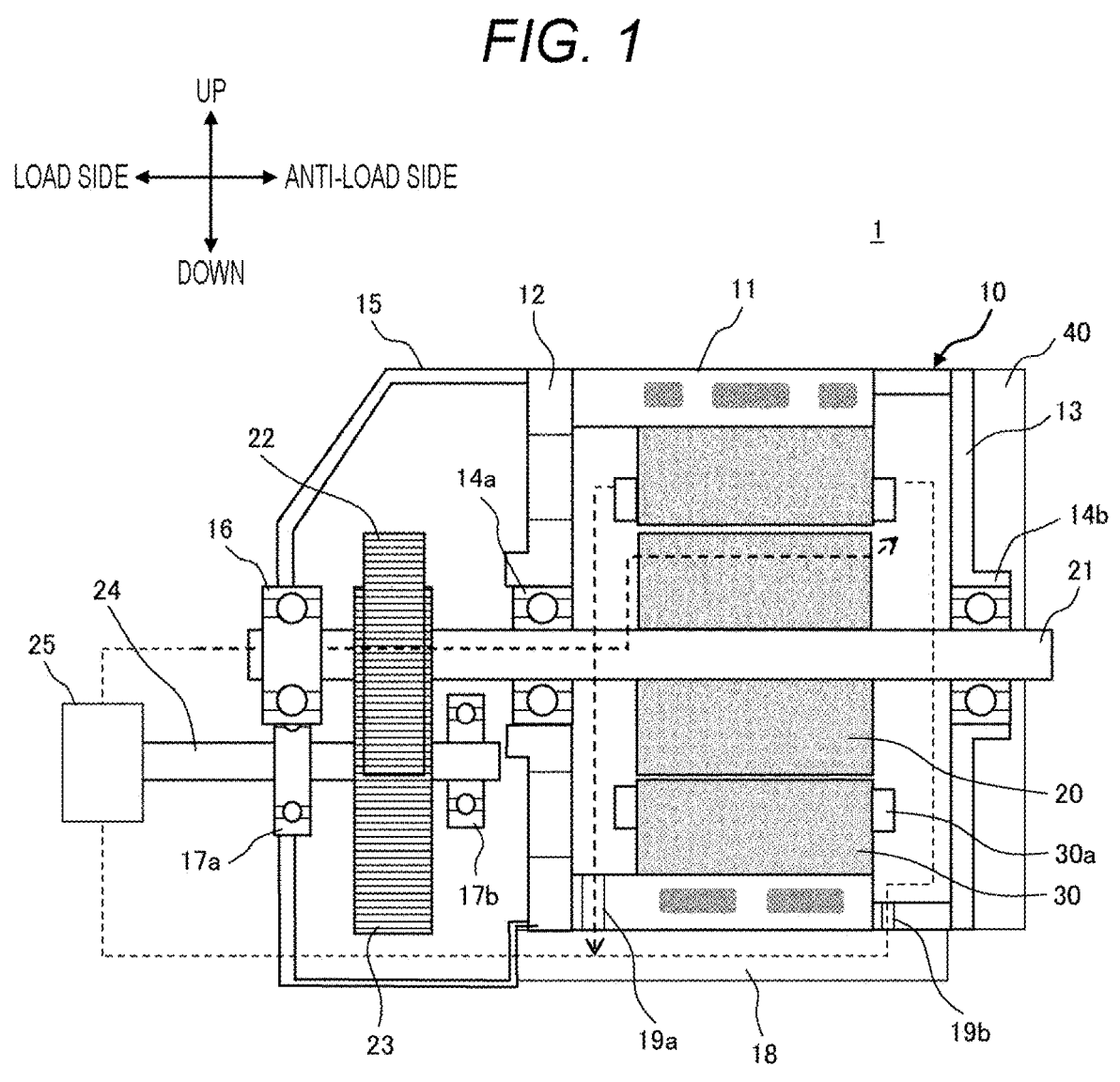
Figure 2:
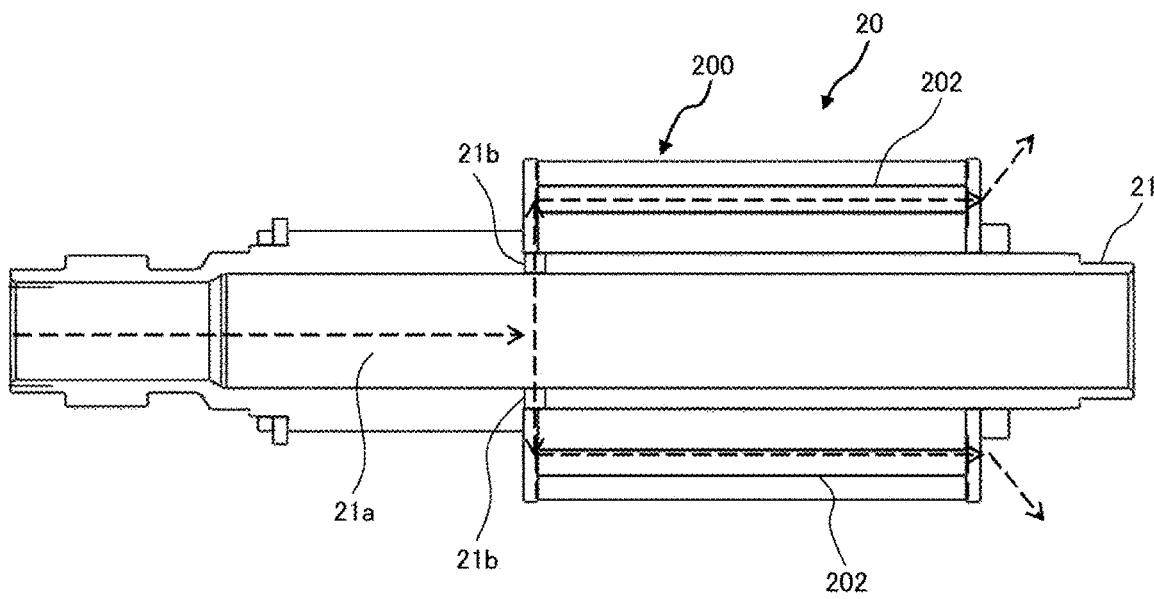
FIG. 2 is a cross-sectional view of a rotor according to Embodiment 1 of the present invention.
Figure 3:
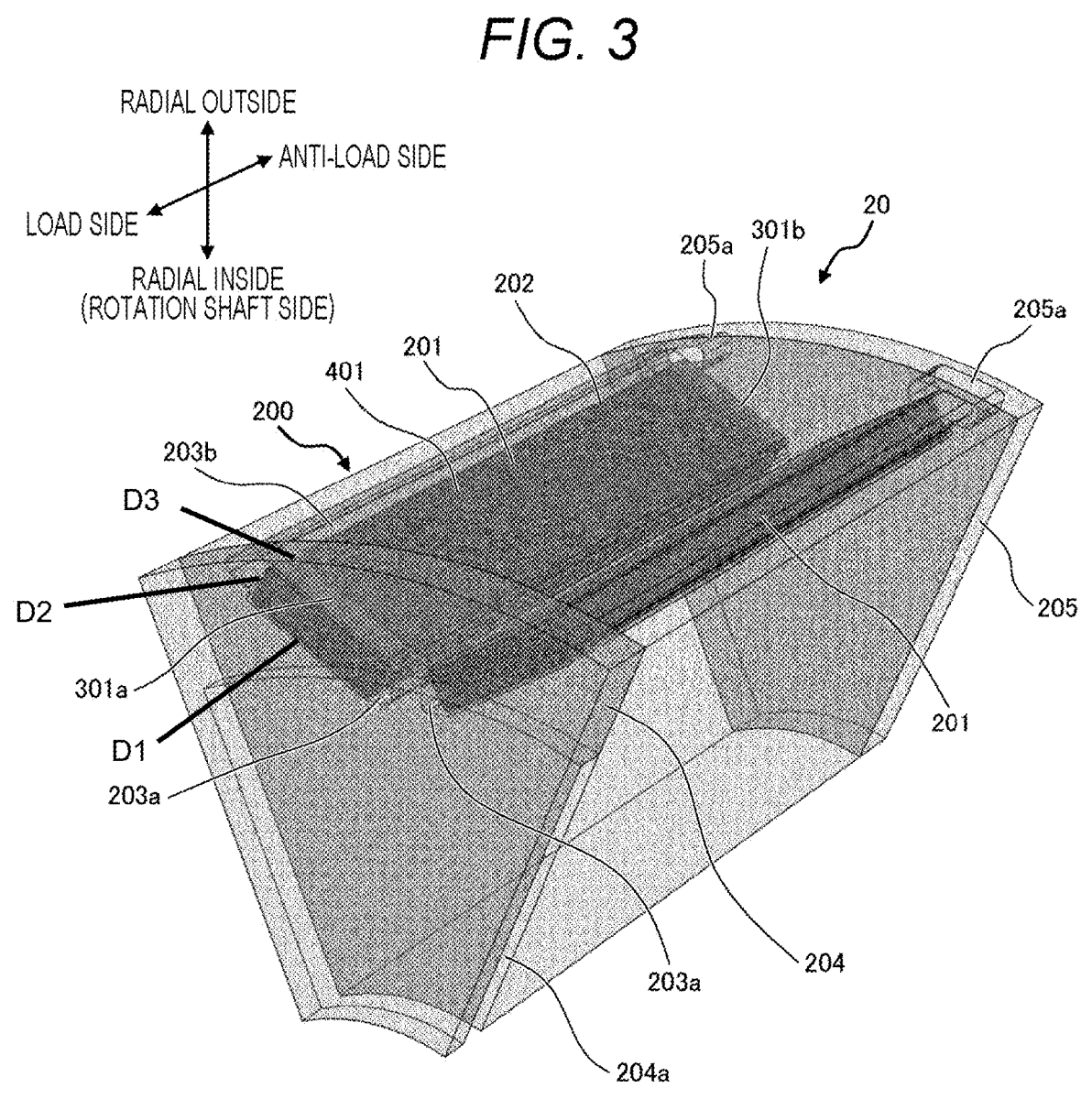
Figure 4:
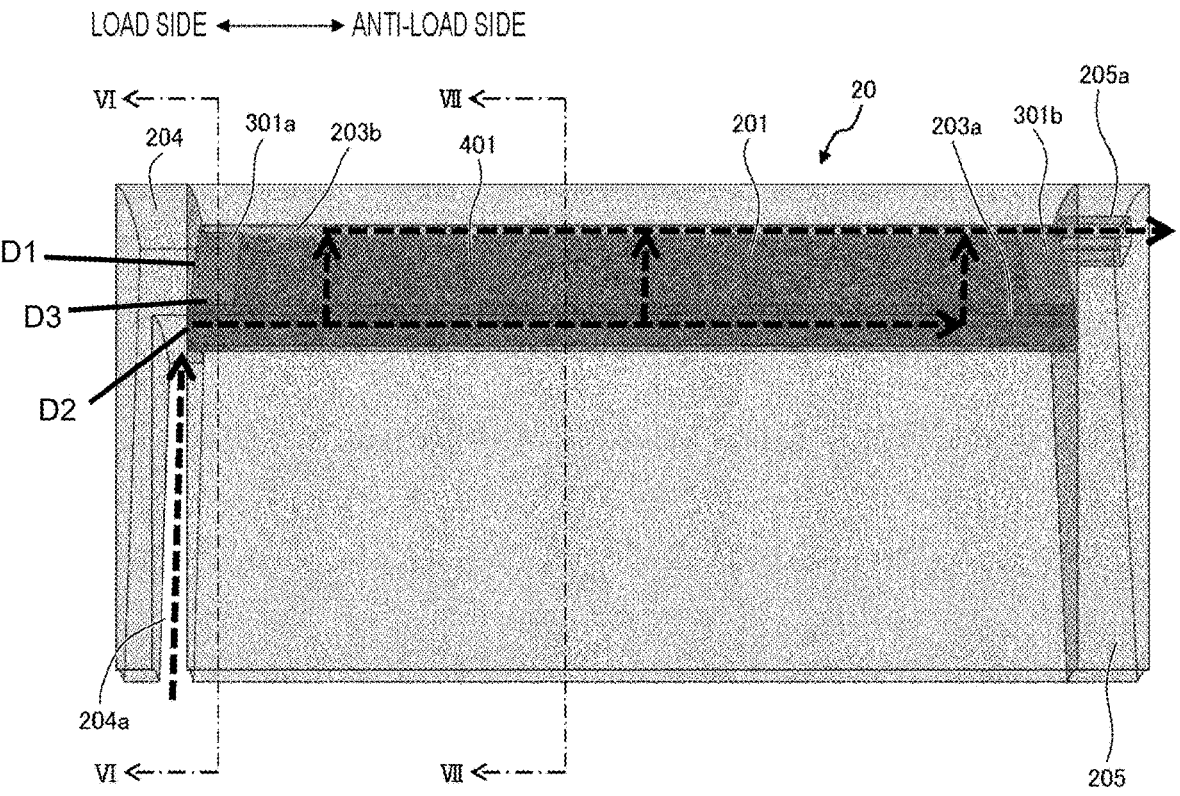
FIG. 4 is an enlarged side view of a portion of the rotor according to Embodiment 1 of the present invention.
Figure 5:
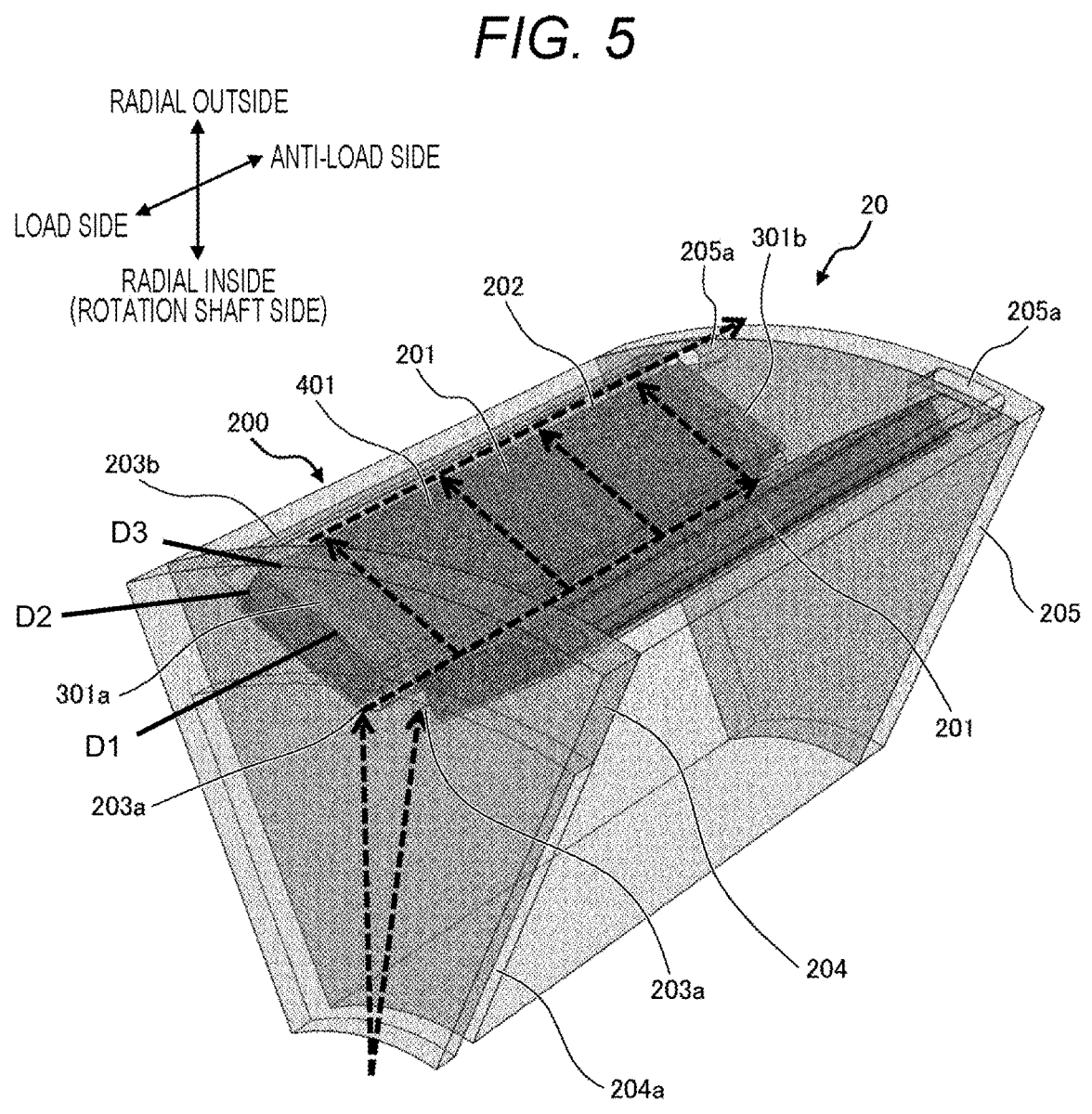
Figures 6, 7:
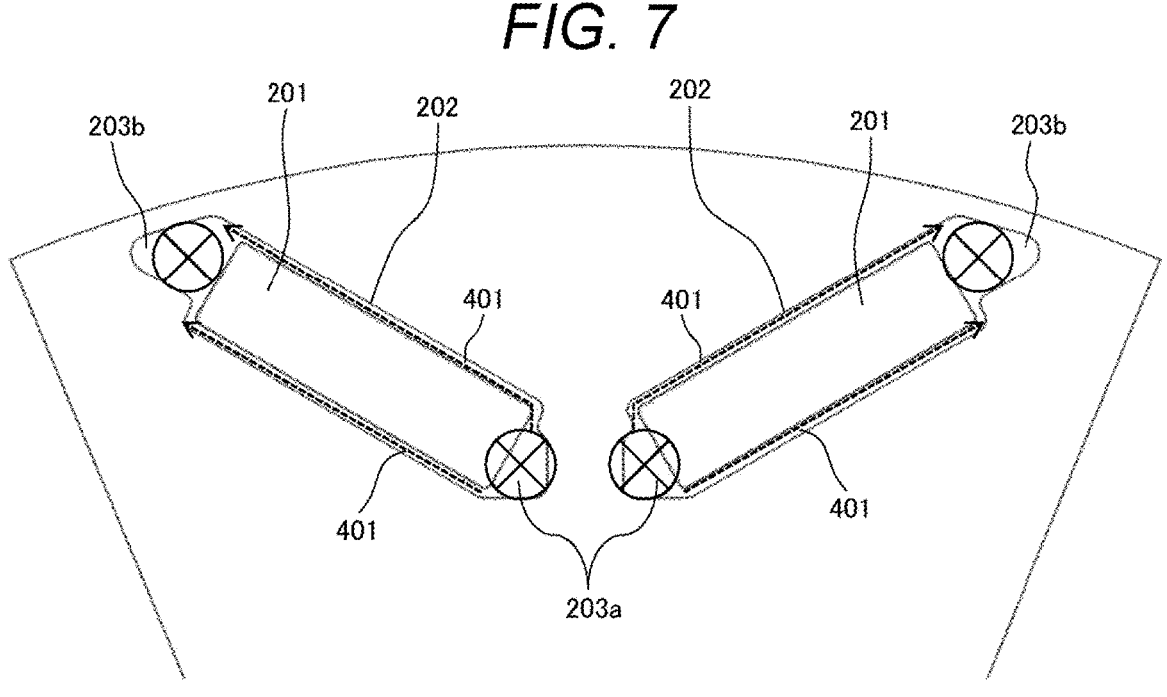
FIG. 6 is a cross-sectional view taken along line VI-VI in FIG. 4.
FIG. 7 is a cross-sectional view taken along line VII-VII in FIG. 4.

Embodiment 1 of the present invention will be described with reference to FIGS. 1 to 7. FIG. 1 is a schematic cross-sectional view of a rotary electric machine according to Embodiment 1 of the present invention in an axial direction. FIG. 2 is a cross-sectional view of a rotor according to Embodiment 1 of the present invention. FIG. 3 is an enlarged perspective view of a portion of the rotor according to Embodiment 1 of the present invention. FIG. 4 is an enlarged side view of a portion of the rotor according to Embodiment 1 of the present invention. FIG. 5 is a perspective view of the rotor illustrating a flow of a refrigerant according to Embodiment 1 of the present invention. FIG. 6 is a cross-sectional view taken along line VI-VI in FIG. 4, and FIG. 7 is a cross-sectional view taken along line VII-VII in FIG. 4. In the drawings, directions described on the paper surface are defined as up, down, a load side, an anti-load side, a radial outside, and a radial inside (rotation shaft side). A longitudinal direction of the rotation shaft is defined as an axial direction.

As illustrated in FIG. 1, a rotary electric machine 1 includes a housing 10 forming an outer frame, a rotor 20 connected to a rotation shaft 21 that is rotatably supported in the housing 10, and a stator 30 that is disposed on an outer circumference of the rotor 20 and includes a winding 30a.

The housing 10 includes a cylindrical member 11 formed in a cylindrical shape, a load-side bracket 12 that closes an opening on one side of the cylindrical member 11, and an anti-load-side bracket 13 that closes an opening on the other side of the cylindrical member 11. The load-side bracket 12 and the anti-load-side bracket 13 are respectively provided with bearings 14a and 14b that rotationally support the rotation shaft 21.

An inverter 40 that drives the rotary electric machine 1 is provided on the anti-load side of the housing 10.

A first gear 22 that rotates together with the rotation shaft 21 is fixed to the load side of the rotation shaft 21. The first gear 22 engages with the second gear 23, and the second gear 23 is fixed to a pump rotation shaft 24. The pump rotation shaft 24 is connected to a pump 25 for circulating a refrigerant (cooling oil). A cover member 15 is provided on the load side of the load-side bracket 12 to cover the first gear 22 and the second gear 23. The cover member 15 includes a bearing 16a that supports the load-side end portion of the rotation shaft 21 and a bearing 17a that supports one end of the pump rotation shaft 24. In a space surrounded by the cover member 15 and the load-side bracket 12, a bearing 17b that supports the other end of the pump rotation shaft 24 is provided.

A refrigerant storage portion 18 that stores a refrigerant is provided below the housing 10. The refrigerant storage portion 18 is connected to the pump 25 via a pipe (not illustrated), and the pump 25 is connected to a first flow path 21a of the rotation shaft 21 via a pipe (not illustrated).

As illustrated in FIG. 2, the first flow path 21a extends from the load-side end portion of the rotation shaft 21 to the central portion in the axial direction, is bent radially outward in the vicinity of the load-side end portion of the rotor 20, and is formed by a through-hole 21b formed on the radial outside.

The rotor 20 includes a magnet 201 (permanent magnet) and a rotor core 200 that houses the magnet 201. The magnet 201 in the present embodiment is made of heavy rare earths such as neodymium, dysprosium, and terbium. The rotor core 200 is formed by stacking electromagnetic steel plates.

As illustrated in FIGS. 3 and 4, in the rotor core 200, there are formed a magnet insertion hole 202 (magnet region) that penetrates in the axial direction and is provided for inserting the magnet 201, and flux barriers 203a and 203b (flux barrier regions) that are formed to penetrate along the axial direction of the short side on the short side of a rectangular cross section of the magnet 201. The flux barrier 203a is located on the radial inside of the rotor core 200, and the flux barrier 203b is located on the radial outside of the rotor core 200. The flux barriers 203a and 203b (flux barrier regions) are provided to be joined to the magnet insertion hole 202 (magnet region) and to cause a demagnetization action.

The magnet insertion hole 202 is formed in a V-shape, and the magnet 201 inserted into the magnet insertion hole 202 is also disposed in a V-shape. Core end members 204 and 205 are provided at axial end portions of the rotor core 200 on the load side and the anti-load side, respectively.

In the core end member 204 located on the load side, a second flow path 204a communicating with the through-hole 21b that forms the first flow path 21a of the rotation shaft 21 is formed. The second flow path 204a extends radially outward from the rotation shaft side and communicates with the flux barrier 203a located on the radial inside. That is, the second flow path 204a functions as a flow path joining the first flow path 21a and the flux barrier 203a.

A refrigerant discharge hole 205a is formed in the core end member 205 located on the anti-load side. The refrigerant discharge hole 205a is formed to penetrate the core end member 205 in the axial direction, and communicates with the flux barrier 203b located on the radial outside.

A current is applied to the winding 30a of the stator 30 of the rotary electric machine 1 by a power source such as the inverter 40 for driving the rotary electric machine 1, and torque is generated with the rotation of the rotor 20. At this time, an eddy current is generated on the surface of the magnet 201 due to a harmonic component of the current superimposed on the winding 30a. Thus, the magnet 201 generates heat. Since the temperature of the magnet 201 is particularly high in the vicinity of the axial central portion, it is required to actively cool this portion. On the other hand, the magnet insertion hole 202 is configured to be larger than the outer diameter of the magnet 201 in order to allow insertion of the magnet 201. A gap is formed between the outer surface of the magnet 201 and the inner surface of the magnet insertion hole 202. Since the magnet is not fixed in the magnet insertion hole, there is a concern that the magnet collides with the wall surface of the magnet insertion hole due to a centrifugal force generated during rotation of the rotor and a repulsive force generated when the rotor stops, and the magnet is damaged. In addition, if an adhesive is poured into the magnet insertion hole to fix the magnet, the refrigerant does not flow. Thus, the magnet cannot be effectively cooled. Means for solving such a problem will be described.

As illustrated in FIGS. 3 to 6, interposed members 301*a* and 301*b* are provided between the magnet 201 and the rotor core. The interposed members 301*a* and 301*b* are disposed on both long sides of the rectangular cross section of the magnet 201 when viewed from the axial direction. In the present embodiment, the interposed members 301*a* and 301*b* are disposed at both end portions (load side and anti-load side) of the magnet 201 in the axial direction and have dimensions D1, D2, and D3 as shown in FIGS. 3-5 and 9-10. As the interposed members 301*a* and 301*b*, for example, a foamed adhesive is used. The foamed adhesive is formed by dispersing and blending a foaming agent in a base adhesive. As the foaming agent, for example, micro-capsules containing alcohol or the like are used. The interposed members 301a and 301b are disposed to protrude from the surface of the magnet 201 and are in contact with the inner wall surface of the magnet insertion hole 202 as illustrated in FIG. 6. As a result, the magnet 201 is fixed in the magnet insertion hole 202, and the movement is restricted. On the other hand, in the long side of the rectangular cross section of the magnet 201 in which the interposed members 301*a* and 301*b* are not disposed, a cooling flow path 401 communicating with the flux barriers 203*a* and 203*b* is formed on both facing surfaces of the magnet insertion hole 202 in the axial direction as illustrated in FIG. 7. That is, the interposed members 301*a* and 301*b* are provided along the axial direction such that the cooling flow path 401 for the refrigerant is formed on both facing surfaces of the central portion of the magnet 201 in the axial direction, which are long sides of the rectangular cross section of the magnet 201 viewed from the axial direction.

Next, a flow of the refrigerant will be described. A broken line in the drawing indicates the flow of the refrigerant. In FIG. 1, when the rotary electric machine 1 starts an operation and the rotor 20 rotates, the first gear 22 fixed to the rotation shaft 21 of the rotor 20 rotates, and the rotational force of the first gear 22 is transmitted to the second gear 23. The second gear 23 rotates the pump rotation shaft 24 to rotationally drive the pump 25 connected to the pump rotation shaft 24. When the pump 25 rotates, the refrigerant stored in the refrigerant storage portion 18 is sucked into the pump 25, pressurized in the pump 25, discharged from the pump 25, and then supplied to the first flow path 21*a* of the rotation shaft 21.

As illustrated in FIG. 2, the refrigerant flowing into the first flow path 21*a* is discharged from the through-hole 21*b* formed on the radial outside by the action of the centrifugal force. The refrigerant discharged from the through-hole 21*b* forming the first flow path 21*a* flows into the second flow path 204*a* by the action of the centrifugal force as illustrated in FIGS. 4 and 5. The refrigerant discharged from the second flow path 204*a* flows into the flux barrier 203*a*, and flows into the cooling flow path 401 from the flux barrier 203*a* as illustrated in FIGS. 4, 5, and 7. The refrigerant flows through the cooling flow path 401 to cool both long sides of the rectangular cross section of the magnet 201. Since the interposed members 301*a* and 301*b* are disposed to avoid the position of the axial central portion of the magnet 201, the refrigerant effectively cools the central portion having the highest temperature. The refrigerant having passed through the cooling flow path 401 flows into the flux barrier 203*b* on the radial outside, and then is discharged from the refrigerant discharge hole 205*a* of the core end member 205 to the anti-load side. The refrigerant discharged from the refrigerant discharge hole 205*a* falls downward as illustrated in FIG. 1, passes through through-holes 19*a* and 19*b*, and then is collected in the refrigerant storage portion 18. Then, the refrigerant is sucked from the pump 25 again to cool the magnet 201.

According to Embodiment 1, the movement of the magnet 201 can be suppressed by the interposed members 301*a* and 301*b*, and the cooling flow path 401 through which the refrigerant flows is formed on both surfaces of the axial central portion of the magnet 201. Thus, it is possible to provide the rotary electric machine in which the damage of the magnet 201 is suppressed and the cooling performance of the magnet 201 is improved.

Embodiment 2

Figure 8:
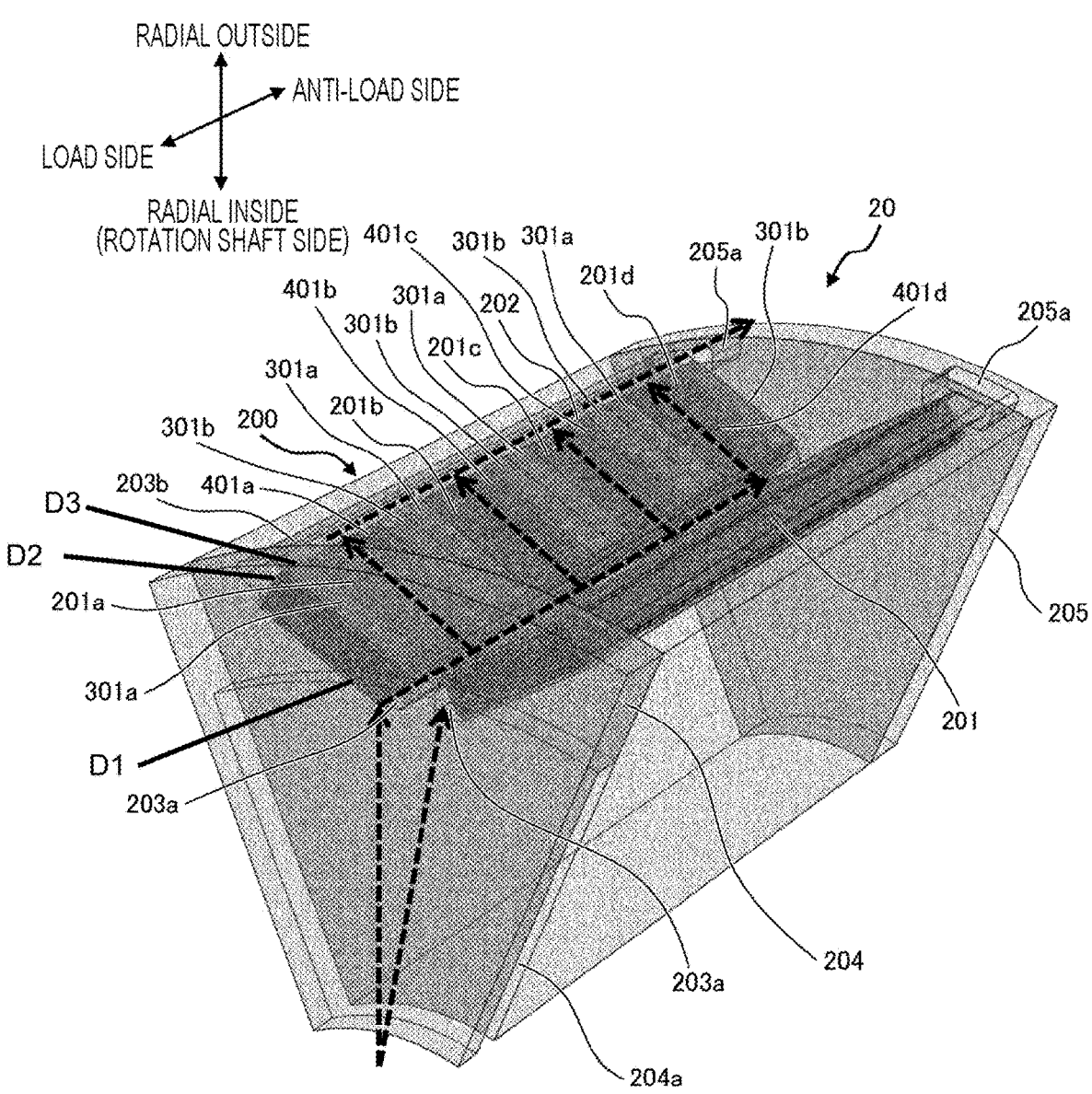
FIG. 8 is an enlarged perspective view of a portion of a rotor according to Embodiment 2 of the present invention.

Embodiment 2 of the present invention will be described with reference to FIG. 8. FIG. 8 is an enlarged perspective view of a portion of a rotor according to Embodiment 2 of the present invention. The components common to those of Embodiment 1 are denoted by the same reference signs, and the detailed description thereof will be omitted.

Embodiment 2 is different from Embodiment 1 in that the magnet 201 is divided. An eddy current is generated in the magnet 201, which results in an eddy current loss. As a countermeasure for reducing the eddy current loss, it is effective to arrange a plurality of divided magnets.

In FIG. 8, a plurality of magnets 201*a*, 201*b*, 201*c*, and 201*d* is arranged in the magnet insertion hole 202 of the rotor core 200. Further, the interposed members 301*a* and 301*b* are provided on both long sides of the rectangular cross section of each of the magnets 201*a*, 201*b*, 201*c*, and 201*d*.

The refrigerant discharged through the second flow path 204*a* flows into the flux barrier 203*a*, and flows from the flux barrier 203*a* into cooling flow paths 401*a*, 401*b*, 401*c*, and 401*d*. The refrigerant flows through the cooling flow paths 401*a*, 401*b*, 401*c*, and 401*d* to cool both long sides of the rectangular cross sections of the magnets 201*a*, 201*b*, 201*c*, and 201*d*. Since the interposed members 301*a* and 301*b* are disposed to avoid the positions of the axial central portions of the magnets 201*a*, 201*b*, 201*c*, and 201*d*, the refrigerant effectively cools the central portion having the highest temperature. The refrigerant having passed through the cooling flow paths 401*a*, 401*b*, 401*c*, and 401*d* flows into the flux barrier 203*b* on the radial outside, and is discharged to the anti-load side from the refrigerant discharge hole 205*a* of the core end member 205.

According to Embodiment 2, since the plurality of magnets 201*a*, 201*b*, 201*c*, and 201*d* is arranged, it is possible to reduce the eddy current loss and to suppress the movement of each of the magnets 201*a*, 201*b*, 201*c*, and 201*d* by the interposed members 301*a* and 301*b*.

Furthermore, according to Embodiment 2, since the cooling flow paths 401*a*, 401*b*, 401*c*, and 401*d* through which the refrigerant flows are formed on both surfaces of the axial central portion of the magnet 201*a*, 201*b*, 201*c*, and 201*d*, it is possible to provide a rotary electric machine in which damage of the magnets 201*a*, 201*b*, 201*c*, and 201*d* is suppressed and cooling performance of the magnets 201a, 201b, 201c, and 201d is improved.

Embodiment 3

Figure 9:
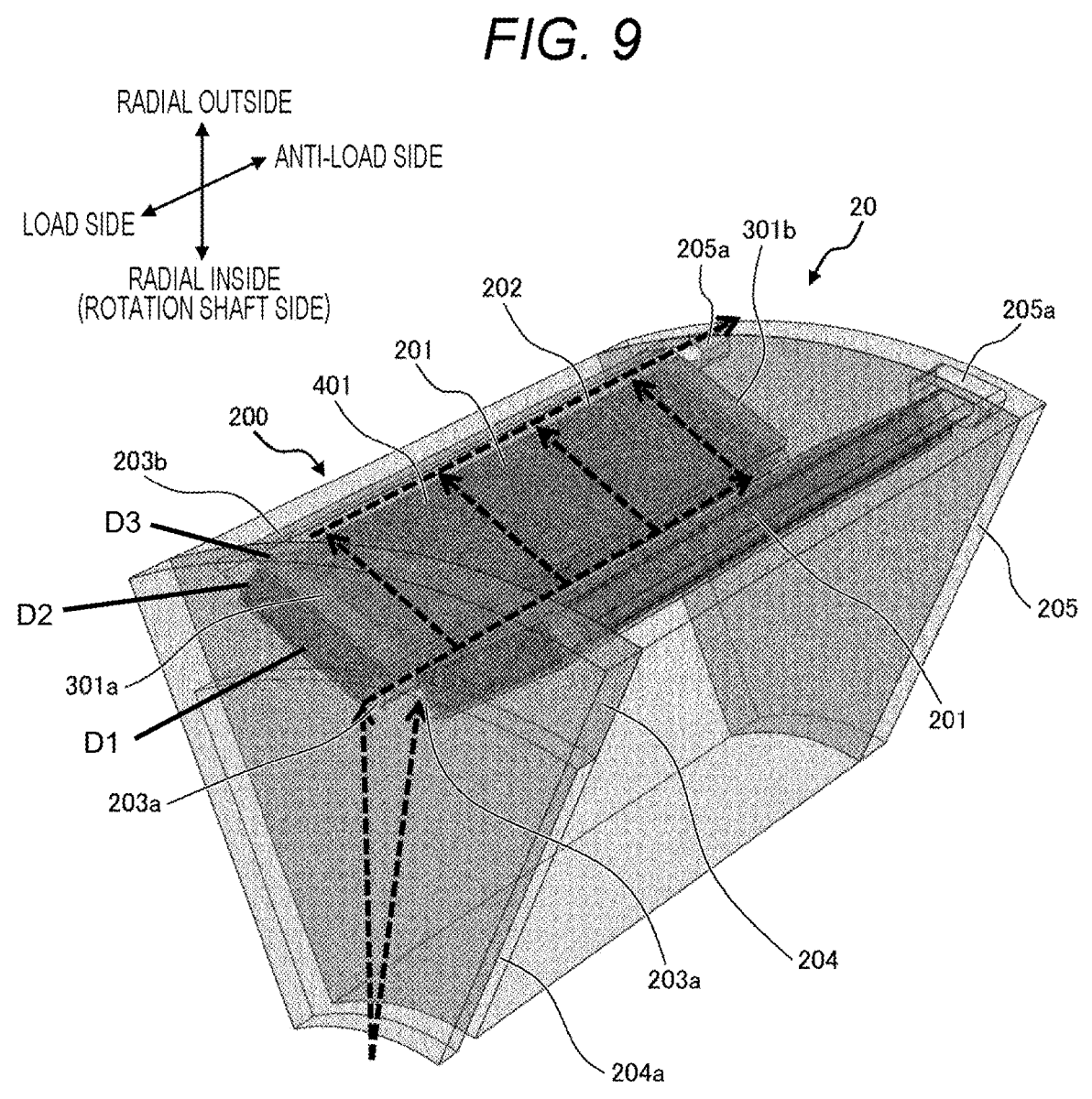

Embodiment 3 of the present invention will be described with reference to FIG. 9. FIG. 9 is an enlarged perspective view of a portion of a rotor according to Embodiment 3 of the present invention. The components common to those of Embodiment 1 are denoted by the same reference signs, and the detailed description thereof will be omitted.

Embodiment 3 is different from Embodiment 1 in that the interposed members 301a and 301b are disposed on the entire circumference of the magnet 201. That is, in Embodiment 3, the interposed members 301a and 301b are disposed not only on the long sides of the rectangular cross section of the magnet 201 but also on the short sides of the rectangular cross section. The flux barriers 203a and 203b are formed to be narrower than the short sides of the rectangular cross section of the magnet 201 (see FIG. 6). The interposed members 301a and 301b disposed on the short sides of the rectangular cross section of the magnet 201 abut on the flux barriers 203a and 203b formed to be narrower than the short sides of the rectangular cross section of the magnet 201, and thus suppress the movement of the magnet 201. The flow of the refrigerant flowing through the cooling flow path 401 formed on the long sides of the rectangular cross section of the magnet 201 is the same as that in Embodiment 1.

According to Embodiment 3, in addition to the effects of Embodiment 1, since the interposed members 301a and 301b are disposed on the entire circumference of the magnet 201, the area is increased at a portion at which the magnet 201 is fixed, and it is possible to more strongly suppress the movement of the magnet 201.

Embodiment 4

Figure 10:
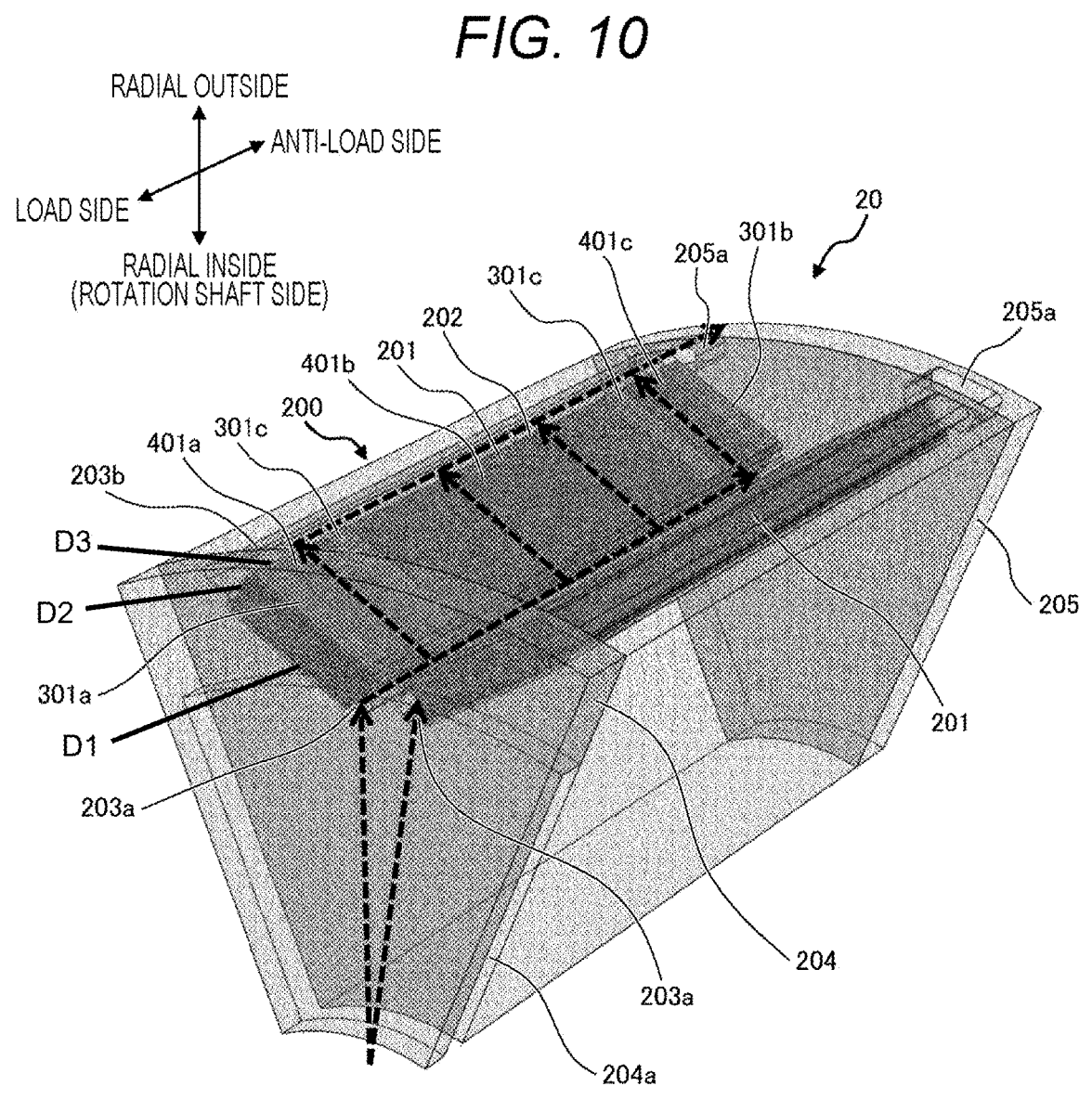

Embodiment 4 of the present invention will be described with reference to FIG. 10. FIG. 10 is an enlarged perspective view of a portion of a rotor according to Embodiment 4 of the present invention. The components common to those of Embodiment 1 are denoted by the same reference signs, and the detailed description thereof will be omitted.

Embodiment 4 is different from Embodiment 1 in that a plurality of cooling flow paths 401 is formed (cooling flow path 401a, cooling flow path 401b, and cooling flow path 401c). That is, in addition to both end portions (interposed members 301a and 301b) of the magnet 201 in the axial direction, interposed members 301c and 301d are disposed at positions other than the central portion to divide the flow path. The refrigerant flowing through the long sides of the rectangular cross section of the magnet 201 flows to avoid the plurality of interposed members 301a, 301b, 301c, and 301d. In Embodiment 4, the refrigerant is divided to flows between the interposed member 301a and the interposed member 301c (cooling flow path 401a), between the interposed member 301c and the interposed member 301d (cooling flow path 401b), and between the interposed member 301d and the interposed member 301b (cooling flow path 401c). In Embodiment 4, the two interposed members 301c and 301d are disposed in addition to the both end portions of the magnet 201 in the axial direction, but the number of interposed members arranged at portions other than the both end portions of the magnet 201 in the axial direction is not limited thereto. Three or more interposed members may be arranged.

According to Embodiment 4, in addition to the effects of Embodiment 1, since the number of interposed members arranged at portions other than both end portions of the magnet 201 in the axial direction is freely set, it is possible to adjust the position of the refrigerant flowing through the long sides of the rectangular cross section of the magnet 201. Furthermore, it is possible to freely adjust the flow rate of the refrigerant flowing through the long side of the rectangular cross section of the magnet 201.

Note that, in Embodiment 4, similarly to Embodiment 3, the interposed members 301a, 301b, 301c, and 301d may be arranged on the entire circumference of the magnet 201. In this case, the same effects as those of Embodiment 3 are exhibited.

Embodiment 5

Figure 11:
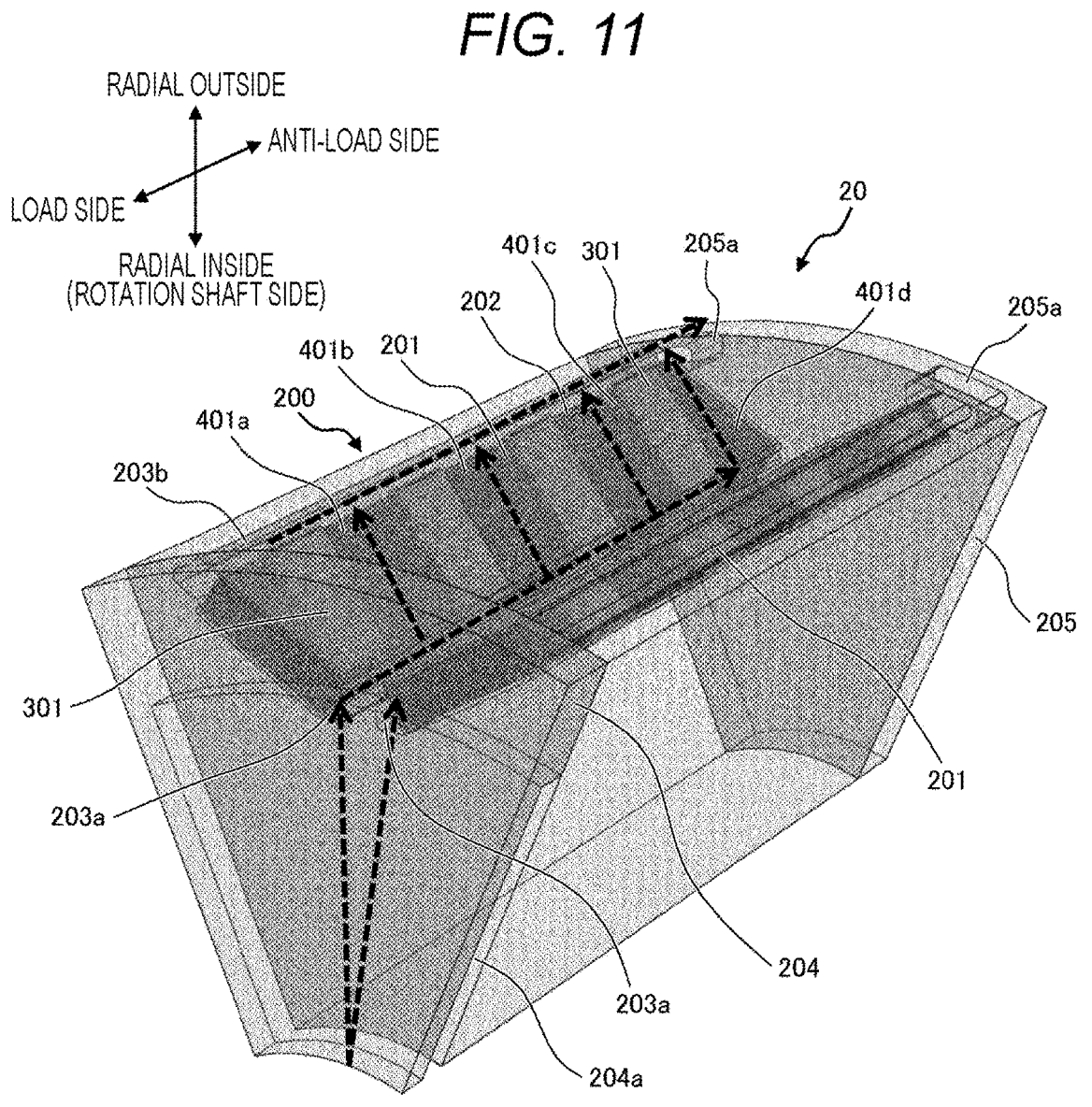

Embodiment 5 of the present invention will be described with reference to FIG. 11. FIG. 11 is an enlarged perspective view of a portion of a rotor according to Embodiment 5 of the present invention. The components common to those of Embodiment 1 are denoted by the same reference signs, and the detailed description thereof will be omitted.

Embodiment 5 is different from Embodiment 1 in that the interposed member 301 is spirally disposed in the axial direction of the magnet 201. That is, in Embodiment 5, one interposed member 301 is disposed to be continuously wound in a spiral shape from the load-side end portion toward the anti-load-side end portion of the magnet 201.

The refrigerant flowing through the long sides of the rectangular cross section of the magnet 201 flows to avoid the plurality of interposed members 301. In Embodiment 5, the refrigerant is divided and flows through the cooling flow paths 401a, 401b, 401c, and 401d formed between the interposed members 301.

According to Embodiment 5, in addition to the effects of Embodiment 1, since one interposed member 301 is disposed to be continuously wound in a spiral shape from the load-side end portion of the magnet 201 toward the anti-load-side end portion, it is possible to simplify an installation process of the interposed member 301.

Embodiment 6

Figure 12:
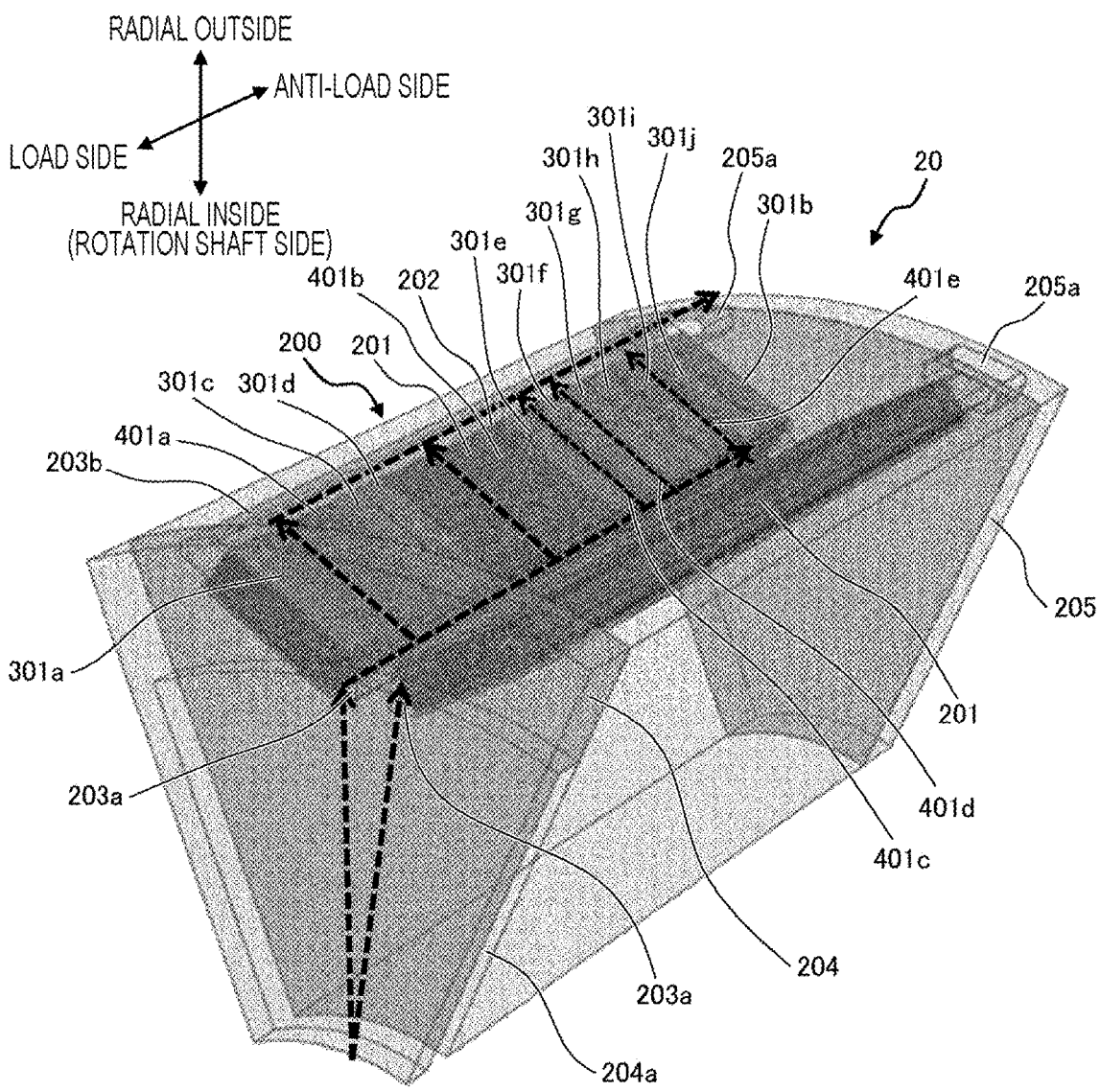
FIG. 12 is an enlarged perspective view of a portion of a rotor according to Embodiment 6 of the present invention.

Embodiment 6 of the present invention will be described with reference to FIG. 12. FIG. 12 is an enlarged perspective view of a portion of a rotor according to Embodiment 6 of the present invention. The components common to those of Embodiment 1 are denoted by the same reference signs, and the detailed description thereof will be omitted.

Embodiment 6 is different from Embodiment 1 in that interposed members 301c to 301j are arranged at any positions other than both end portions (interposed members 301a and 301b) in the axial direction and the central portion of the magnet 201 so that a flow path area is not uniform. That is, in Embodiment 6, by arranging the plurality of interposed members 301c to 301j at any positions, the areas of a plurality of flow paths formed by the plurality of interposed members 301c to 301j are made different from each other.

The refrigerant flowing through the long sides of the rectangular cross section of the magnet 201 flows to avoid the plurality of interposed members 301a to 301j. In Embodiment 6, the axial widths of the interposed members 301a to 301j are set to be equal to each other, and the refrigerant is divided to flow, for example, between the interposed member 301a and the interposed member 301c (cooling flow path 401a), between the interposed member 301d and the interposed member 301e (cooling flow path 401b), between the interposed member 301e and the interposed member 301f (cooling flow path 401c), between the interposed member 301f and the interposed member 301g (cooling flow path 401d), and between the interposed member 301i and the interposed member 301j (cooling flow path 401e). The refrigerant may flow into a gap other than the above description.

In Embodiment 6, the flow path area is made not uniform as follows: cooling flow path 401b>cooling flow path 401a>cooling flow path 401c>cooling flow path 401e>cooling flow path 401d.

According to Embodiment 6, in addition to the effects of Embodiment 1, since the interposed members arranged at portions other than the both end portions of the magnet 201 in the axial direction are arranged not to be uniform, it is possible to freely adjust the flow rate of the refrigerant flowing between the interposed members on the long sides of the rectangular cross section of the magnet 201. Therefore, it is possible to cause a large amount of refrigerant to flow to a portion of the magnet 201, which is desired to be actively cooled.

Note that, in Embodiment 6, similarly to Embodiment 3, the interposed members 301a to 301j may be arranged on the entire circumference of the magnet 201. In this case, the same effects as those of Embodiment 3 are exhibited.

Embodiment 7

Figure 13:
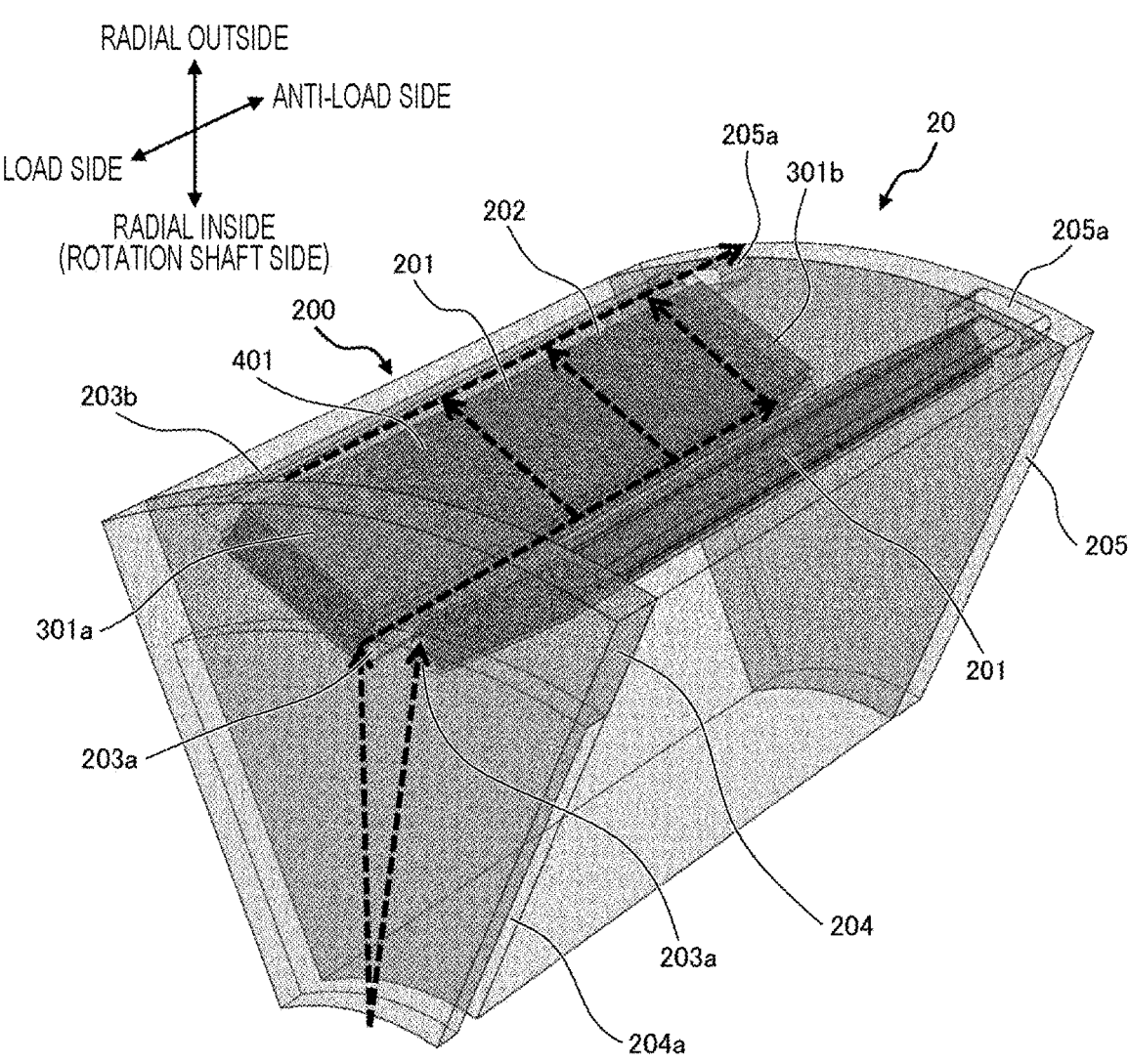
FIG. 13 is an enlarged perspective view of a portion of a rotor according to Embodiment 7 of the present invention.

Embodiment 7 of the present invention will be described with reference to FIG. 13. FIG. 13 is an enlarged perspective view of a portion of a rotor according to Embodiment 7 of the present invention. The components common to those of Embodiment 1 are denoted by the same reference signs, and the detailed description thereof will be omitted.

Embodiment 7 is different from Embodiment 1 in that the axial widths of the interposed member 301a and the interposed member 301b disposed at both end portions of the magnet 201 in the axial direction are made different from each other (not uniform). That is, the axial width of the interposed member 301a which is the other interposed member is made wider than the axial width of the interposed member 301b which is one interposed member. The refrigerant flowing through the long sides of the rectangular cross section of the magnet 201 flows to avoid the interposed members 301a and 301b. Since the axial width of the interposed member 301a is formed to be wider than the axial width of the interposed member 301b, it is possible to shift the position at which the refrigerant flows, toward the interposed member 301b. In addition, since the flow path between the interposed member 301a and the interposed member 301b is narrowed, it is possible to increase the flow velocity of the refrigerant flowing through the cooling flow path 401.

According to Embodiment 7, since the axial widths of the interposed member 301a and the interposed member 301b are made different from each other, it is possible to freely change the position of the flow path and to adjust the position of the refrigerant flowing through the magnet 201. Furthermore, since the flow path between the interposed member 301a and the interposed member 301b is narrowed, it is possible to increase the flow velocity of the refrigerant flowing through the flow path, to increase the flow velocity of the refrigerant flowing through the axial central portion of the magnet 201, and to effectively cool the axial central portion of the magnet 201.

Note that, in Embodiment 7, similarly to Embodiment 3, the interposed members 301a and 301b may be disposed on the entire circumference of the magnet 201. In this case, the same effects as those of Embodiment 3 are exhibited.

Embodiment 8

Figure 14:
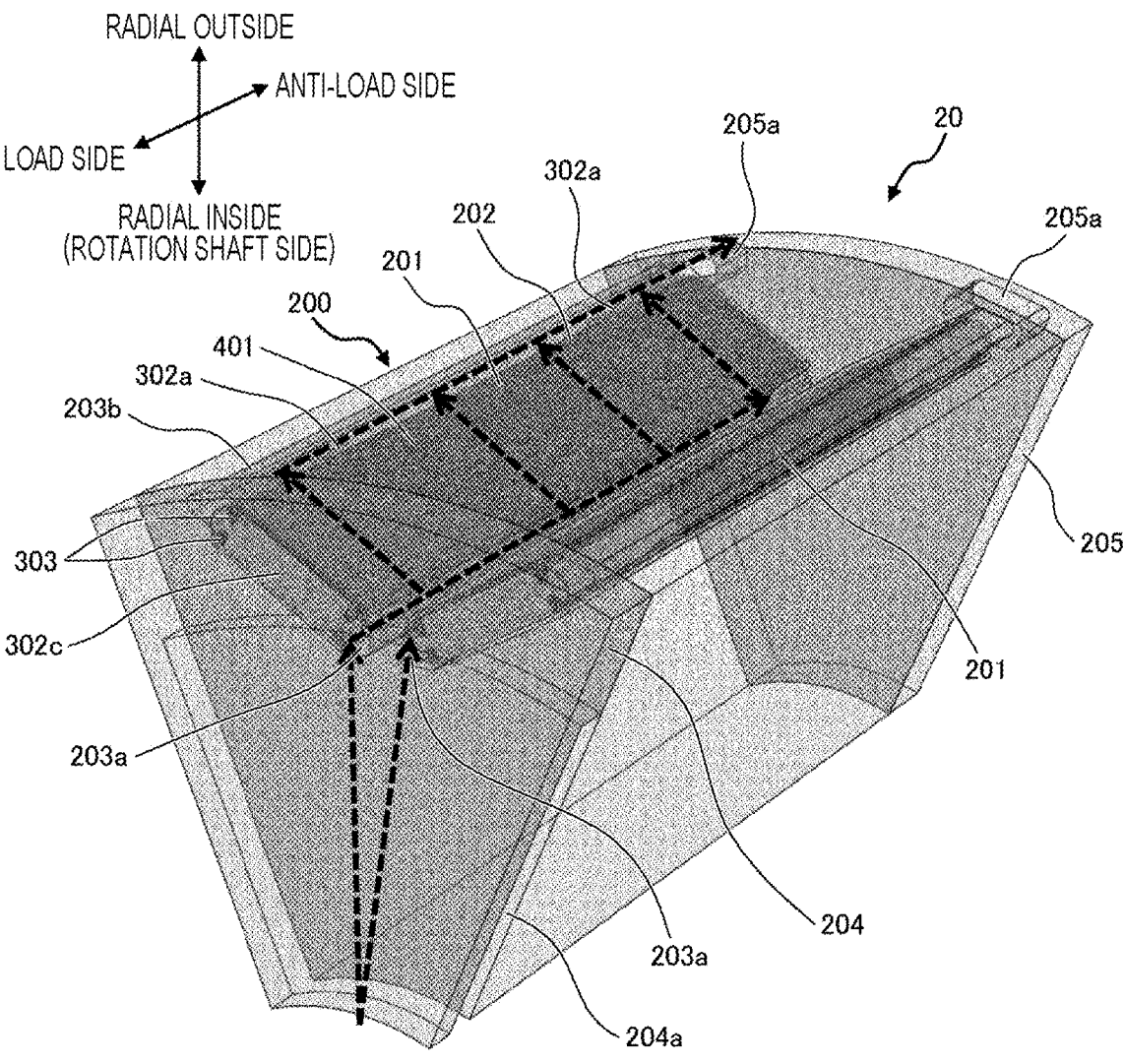
FIG. 14 is an enlarged perspective view of a portion of a rotor according to Embodiment 8 of the present invention.
Figure 15:
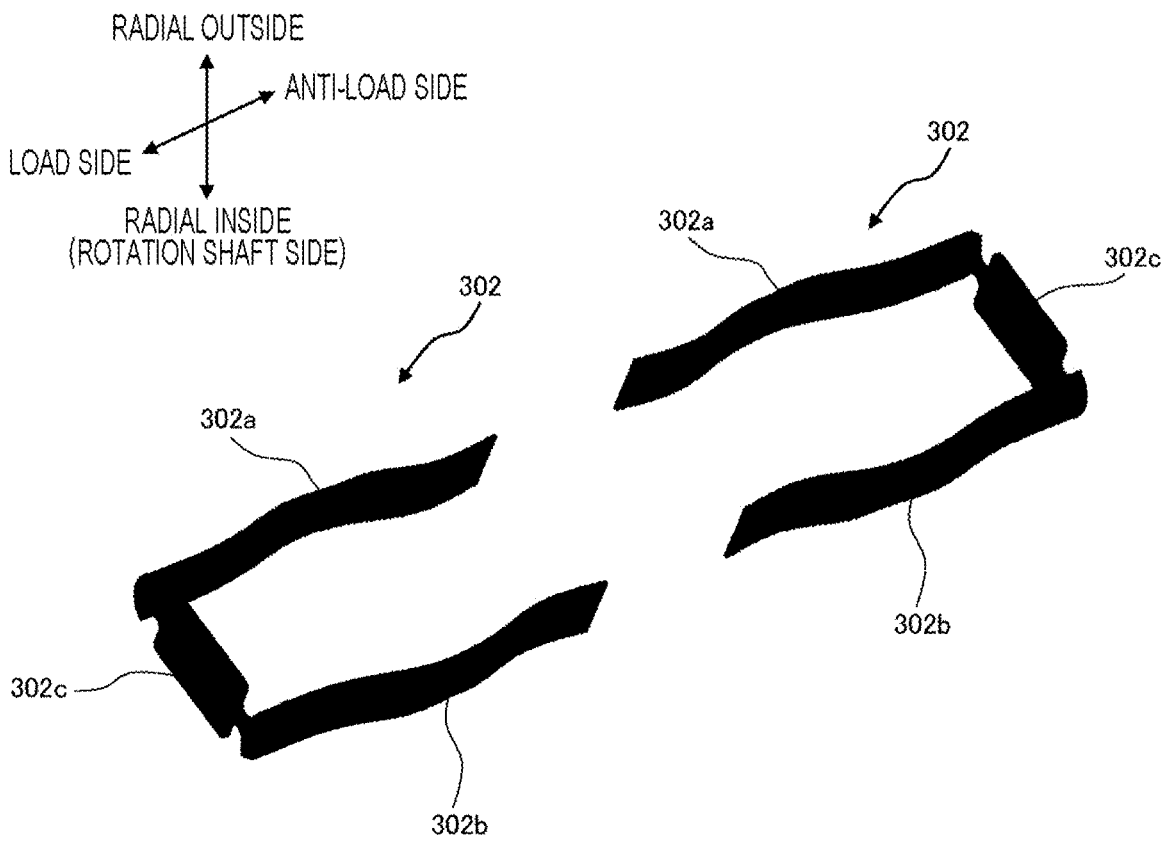
FIG. 15 is an enlarged view of an interposed member.

Embodiment 8 of the present invention will be described with reference to FIGS. 14 and 15. FIG. 14 is an enlarged perspective view of a portion of a rotor according to Embodiment 8 of the present invention. FIG. 15 is an enlarged view of an interposed member. The components common to those of Embodiment 1 are denoted by the same reference signs, and the detailed description thereof will be omitted.

Embodiment 8 is different from Embodiment 1 in that the interposed member disposed at both end portions of the magnet 201 in the axial direction are formed by elastic members 302.

The elastic member 302 is formed in a U-shape when viewed from the radial outside or the radial inside. The elastic member 302 includes a plurality of spring portions 302a and 302b in which an axial central portion forming a portion of both side surfaces of the U-shape is curved, and a connection fixing portion 302c that connects the plurality of spring portions 302a and 302b.

The elastic member 302 is mounted from both end portions of the magnet 201 in the axial direction toward the axial center portion such that the spring portions 302a and 302b are along the short sides of the rectangular cross section of the magnet 201. The connection fixing portion 302c is fixed to both end portions of the magnet 201 by fastening members 303.

The spring portions 302a and 302b are disposed at the flux barriers 203a and 203b, respectively, and curved central portions thereof are in contact with the inner walls of the flux barriers 203a and 203b to hold the magnet 201. The cooling flow path 401 is formed over the entirety of the long sides of the rectangular cross section of the magnet 201 in the axial direction. Since the elastic member 302 for forming the cooling flow path 401 is only mounted from the end portion of the magnet 201 in the axial direction, it is possible to simplify a manufacturing process.

According to Embodiment 8, in addition to the effects of Embodiment 1, since the elastic member 302 for forming the cooling flow path 401 is only mounted from the end portion of the magnet 201 in the axial direction, it is possible to simplify the manufacturing process.

Note that, the present invention is not limited to the above-described embodiment, and various modifications may be provided. The above-described embodiments are described in detail in order to explain the present invention in an easy-to-understand manner, and the above embodiments are not necessarily limited to a case including all the described configurations.

REFERENCE SIGNS LIST 1 rotary electric machine
10 housing
11 cylindrical member
12 load-side bracket
13 anti-load-side bracket
14a, 14b, 16a, 17a, 17b bearing
15 cover member
18 refrigerant storage portion
19a, 19b through-hole

20 rotor
21 rotation shaft
21*a* first flow path
21*b* through-hole
22 first gear
23 second gear
24 pump rotation shaft
25 pump
30 stator
30*a* winding
40 inverter
200 rotor core
201, 201*a*, 201*b*, 201*c*, 201*d* magnet
202 magnet insertion hole
203*a*, 203*b* flux barrier
204, 205 core end member
204*a* second flow path
205*a* refrigerant discharge hole
301, 301*a*, 301*b*, 301*c*, 301*d*, 301*e*, 301*f*, 301*g*, 301*h*, 301*i*, 301*j* interposed member
302 elastic member
302*a*, 302*b* spring portion
302*c* connection fixing portion
303 fastening member
401, 401*a*, 401*b*, 401*c*, 401*d*, 401*e* cooling flow path

The invention claimed is:

1. A rotary electric machine comprising:
a rotation shaft;
a rotor connected to the rotation shaft; and
a core end member connected to an end portion of the rotor in an axial direction,
wherein the rotor includes a first magnet, a rotor core that houses the first magnet, and a first interposed member and a second interposed member are interposed between the first magnet and the rotor core,
in the rotor core, a magnet region for disposing the first magnet, and a flux barrier region that is joined to the magnet region and causes a demagnetization action are formed,
the rotation shaft is provided with a first flow path through which a refrigerant flows,
the core end member is provided with a second flow path joining the first flow path and the flux barrier region,
the first and the second interposed members are provided along the axial direction such that a cooling flow path for the refrigerant is formed on both facing surfaces of a central portion of the first magnet in the axial direction, which are long sides of a rectangular cross section of the first magnet when viewed from the axial direction, and
the first interposed member is only disposed at a distal most end portion of the first magnet and the second interposed member is only disposed at a proximal most end portion of the first magnet in the axial direction, wherein the first and the second interposed members include a first dimension, a second dimension, and a third dimension, the first dimension and the second dimension greater than the third dimension, wherein the first and the second interposed members include a surface defining the first dimension and the second dimension, the surface facing the axial direction.

2. The rotary electric machine according to claim 1, wherein the first and second interposed member is a foamed adhesive.

3. The rotary electric machine according to claim 1, wherein a plurality of magnets is provided, and an interposed member is provided in each of the plurality of magnets.

4. The rotary electric machine according to claim 1, wherein a plurality of the interposed members is provided such that a plurality of the cooling flow paths is formed.

5. The rotary electric machine according to claim 4, wherein the first and second interposed members are disposed such that areas of the plurality of cooling flow paths are different from each other.

6. The rotary electric machine according to claim 1, wherein the first and second interposed members are provided in a spiral shape along the axial direction of the first magnet.

7. The rotary electric machine according to claim 1, wherein
the first and second interposed members disposed at the both end portions are disposed so as to have different lengths along the axial direction.

8. The rotary electric machine according to claim 1, wherein
the first and second interposed members include a spring portion which is formed in a U-shape and in which an axial central portion forming a portion of both side surfaces of the U-shape is curved, and
the spring portion is disposed in the flux barrier region.

* * * * *